US009544629B2

(12) United States Patent
Khare et al.

(10) Patent No.: US 9,544,629 B2
(45) Date of Patent: Jan. 10, 2017

(54) METHOD AND APPARATUS FOR GENERATING VIDEO FOR A VIEWING SYSTEM FROM MULTIPLE VIDEO ELEMENTS

(71) Applicant: Broadcom Corporation, Irvine, CA (US)

(72) Inventors: Rajendra Kumar Khare, Karnataka (IN); Brajabandhu Mishra, Karnataka (IN); Sandeep Kumar Relan, Bangalore (IN)

(73) Assignee: BROADCOM CORPORATION, Irvine, CA (US)

( * ) Notice: Subject to any disclaimer, the term of this patent is extended or adjusted under 35 U.S.C. 154(b) by 48 days.

(21) Appl. No.: 14/153,132

(22) Filed: Jan. 13, 2014

(65) Prior Publication Data
US 2014/0130069 A1    May 8, 2014

Related U.S. Application Data

(63) Continuation of application No. 11/403,880, filed on Apr. 14, 2006, now abandoned.
(Continued)

(51) Int. Cl.
| | |
|---|---|
| *H04N 7/173* | (2011.01) |
| *H04N 5/445* | (2011.01) |
| *G06F 3/00* | (2006.01) |
| *H04N 21/2665* | (2011.01) |
| *H04N 21/2343* | (2011.01) |
| *H04N 21/24* | (2011.01) |
| *H04N 21/2543* | (2011.01) |
| *H04N 21/266* | (2011.01) |
| *H04N 21/2668* | (2011.01) |

(Continued)

(52) U.S. Cl.
CPC ...... *H04N 21/2665* (2013.01); *H04N 7/17318* (2013.01); *H04N 21/234345* (2013.01); *H04N 21/2407* (2013.01); *H04N 21/2543* (2013.01); *H04N 21/2668* (2013.01); *H04N 21/26616* (2013.01); *H04N 21/478* (2013.01); *H04N 21/4728* (2013.01); *H04N 21/47202* (2013.01); *H04N 21/6581* (2013.01); *H04N 21/854* (2013.01); *H04N 21/8583* (2013.01)

(58) Field of Classification Search
CPC ................. H04N 21/47202; H04N 21/47205; H04N 21/4728
USPC ............................ 725/39–44, 47–49, 51–59
See application file for complete search history.

(56) References Cited

U.S. PATENT DOCUMENTS 6,240,555 B1 * 5/2001 Shoff et al. ................ 725/110
6,498,816 B1   12/2002 Easwar et al.
(Continued)

*Primary Examiner* — Gigi L Dubasky
(74) *Attorney, Agent, or Firm* — Foley & Lardner LLP

(57) ABSTRACT

A video processing system located at a remote location such as a TV broadcasting station or an Internet media server stores a plurality of video elements at that are delivered to a viewing system located at a viewer's premises. The video processing system is capable of receiving a selection request comprising two or more video elements or subsets thereof, wherein the subsets are regions of interest or portions of the corresponding video elements. The video processing system constructs a custom video by combining them based on the viewer' selection and using the region of interest that are provided, and forwards the custom video to the viewing system. Billing based on record of usage is also supported for the custom video.

18 Claims, 7 Drawing Sheets

Related U.S. Application Data

(60) Provisional application No. 60/757,042, filed on Jan. 9, 2006.

(51) Int. Cl.
<table>
<tr><td>H04N 21/472</td><td>(2011.01)</td></tr>
<tr><td>H04N 21/4728</td><td>(2011.01)</td></tr>
<tr><td>H04N 21/658</td><td>(2011.01)</td></tr>
<tr><td>H04N 21/858</td><td>(2011.01)</td></tr>
<tr><td>H04N 21/478</td><td>(2011.01)</td></tr>
<tr><td>H04N 21/854</td><td>(2011.01)</td></tr>
</table>

(56) References Cited

U.S. PATENT DOCUMENTS

| | | |
|---|---|---|
| 6,526,577 B1 | 2/2003 | Knudson et al. |
| 7,631,327 B2 | 12/2009 | Dempski et al. |
| 2002/0147987 A1 | 10/2002 | Reynolds et al. |
| 2002/0167947 A1 | 11/2002 | Hallford et al. |
| 2002/0170068 A1 | 11/2002 | Rafey et al. |
| 2003/0149988 A1 | 8/2003 | Ellis et al. |
| 2004/0257337 A1 | 12/2004 | Shibamiya et al. |
| 2005/0028208 A1 | 2/2005 | Ellis et al. |
| 2005/0134739 A1 | 6/2005 | Bian |
| 2006/0080717 A1 | 4/2006 | Barzilay et al. |
| 2006/0098086 A1* | 5/2006 | Chandra .......... H04N 7/15 348/14.07 |
| 2006/0221237 A1* | 10/2006 | Min et al. ............. 348/565 |
| 2009/0106393 A1* | 4/2009 | Parr et al. ............. 709/218 |

\* cited by examiner

METHOD AND APPARATUS FOR GENERATING VIDEO FOR A VIEWING SYSTEM FROM MULTIPLE VIDEO ELEMENTS

CROSS REFERENCE TO RELATED APPLICATIONS

This application is a continuation of and claims priority to U.S. patent application Ser. No. 11/403,880 entitled "METHOD AND APPARATUS FOR GENERATING VIDEO FOR A VIEWING SYSTEM FROM MULTIPLE VIDEO ELEMENTS," filed on Apr. 14, 2006, which claims priority to U.S. Provisional Patent Application Ser. No. 60/757,042, filed Jan. 9, 2006, all of which is incorporated by reference herein in its entirety.

BACKGROUND OF THE INVENTION

Field of the Invention

The present invention relates to a video processing system for video processing, and more particularly for customizing videos delivered by the video processing system based on input from a viewer at a viewing system.

Description of the Related Art

Video editing systems which combine two or more videos taken from a video repository are available in market. These systems can switch between videos, wherein the videos are edited to be combined, with simple cut-and-paste to create transitions. Some of them can take multiple video feeds from video cameras and make transitions between the video feeds, where effects such as dissolves, wipes can be used to smooth the transitions. The output is actually multiple sequences of video from the video sources that are cut and pasted together to create a combined sequence. Such combinations are trivial and quite often the transitions are jerky and abrupt.

Some video editing systems can freeze a frame while playing a video feed and, after a time, can perform a transition to a new video feed. It can even hold the frozen frame through the transition. In all the above cases, the final combined video delivered to a viewer can have a limited range of variations depending on the limited number of effects built in the video editing systems.

It is often possible to subscribe to multiple cable TV and satellite TV channels. However, for the most part, only one channel at a time can be viewed. In some picture-in-picture based TV systems, one channel can be viewed in full screen while a portion of the TV screen is occupied by a display of a second channel in a smaller frame. However, both channels are viewed simultaneously in full, if the picture-in-picture is turned on. Due to the overlay portions of the display of the main channel is lost behind the smaller frame that displays the second channel.

Further limitations and disadvantages of conventional and traditional approaches will become apparent to one of ordinary skill in the art through comparison of such systems with the present invention.

BRIEF DESCRIPTION OF THE DRAWINGS

For the present invention to be easily understood and readily practiced, various embodiments will now be described, for purposes of illustration and not limitation, in conjunction with the following figures.

DETAILED DESCRIPTION OF THE PREFERRED EMBODIMENT (S)

Figure 1:
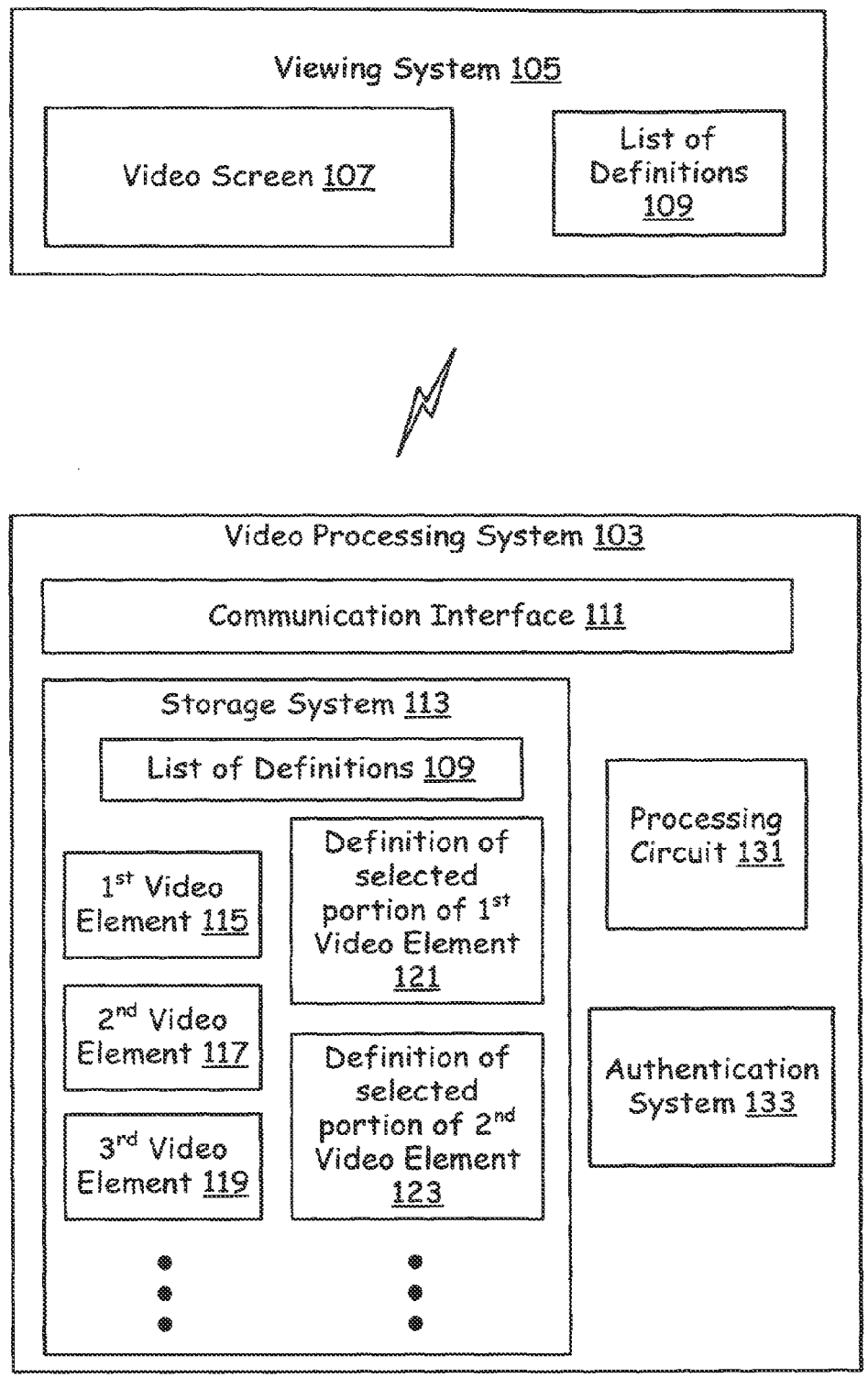
FIG. 1 is a schematic block diagram illustrating a video processing system according to an exemplary embodiment of the invention.

FIG. 1 is a schematic block diagram illustrating a video processing system 103 that constructs a single custom video from portions or all of videos selected from a plurality of video elements stored in the video processing system 103, the portions or all of videos selected as per input from a viewing system 105. The video processing system 103 includes a storage system 113, a communication interface 111, a processing circuit 131 and an authentication system 133. The video processing system 103 stores a plurality of video elements such as 115, 117, 119 in the storage system 113. The plurality of video elements are, for example, a video part of a television channel, a portion of a live video program, a video game, a stored video, and a stored picture.

The processing circuit 131 is communicatively coupled to the communication interface 111 and to the storage system 113. The processing circuit 131 receives selection requests from the viewing system 105 via the communication interface 111. The selection requests are made by a viewer who interacts with the viewing system 105, via a viewer interface, such as a remote control. The video processing system 103 further includes a list of definitions 109. The authentication system 133 authenticates the viewing system 105 and subsequently the processing circuit 131 sends the plurality of video elements, 115,117,119 and the list of definitions 109 to the viewing system 105. The selection requests received from the viewing system 105 include a selection of the portion of the at least one of the plurality of video elements and the portion or all of the at least one other of the plurality of video elements. The selection requests further include definitions of selected portions of selected video elements. The definitions of the selected portions of selected video elements, such as, 121, 123 are stored in the storage system 113. The definitions of the selected portions are chosen from the list of definitions 109. The definitions of the selected portions are, for example, sizes, shapes, positions on a video screen 107 of the viewing system 105, resolutions and brightness of the selected portions. The processing circuit 131 constructs the custom video by combining the selected portions of the selected video elements and delivers the custom video to the viewing system 105.

In one embodiment, the viewing system 105 is a media player that plays a combined video that is received from a video processing system 103 (a video source), such as a TV broadcasting system capable of broadcasting a plurality of TV channels, each with region of interest information. The media player 105 also receives streaming media from an Internet server, stored media from a personal video recorder (PVR), cable TV received by a set-top-box (STB), multimedia from a local media server, and movies from a DVD player.

The video processing system 103, when located at a broadcasting station or an Internet server interacts with the viewing system 105, such as a media player or a home entertainment system, located at a viewer's home. The video processing system 103 is able to provide a plurality of video elements that a viewer can choose from to view on his viewing system 105, for example, on his media player or home entertainment system. The video processing system 103 includes the storage system 113 to store the plurality of video elements, the storage systems 113 can be streaming media servers, multimedia repositories, etc. The communication interface 111 is used to communicate the video elements and associated information to the viewing system 105, and it supports interactions over one or more protocols, in order to facilitate transfer of streaming media, menus, catalogs, security information, rights objects, etc.

The processing circuit 131 is communicatively coupled to the communication interface 111 and to the storage system 113, and is capable of creating a combined output from one or more video elements or delivering one previously created and stored. The processing circuit 131 is capable of processing viewer adjustments to the display characteristics to the combined output viewed by the viewer on a display unit such as the video screen 107. In other embodiments, the processing circuit 131 is capable of receiving user selections and user requests and communicating them, if necessary, to other video processing systems, and receiving from them a combined video which it then further processes before delivering to the viewing systems 105. The processing circuit 131 responds to the viewer's selection requests received from the viewing system 105 via the communication interface 111 by generating a custom video from one or more portions of one or more video elements. Such custom video is then delivered to the viewing system 105 and the viewer can view them on one or more displays, such as the video screen 107.

In accordance with the present invention, a viewer can view a list of available video elements while sitting in his room and make a request of video elements, or create a customized video for delivery, or select from a menu or catalog of composite videos for delivery. These composite videos are preconfigured and pre-selected combinations of portions of videos from one or more video elements, perhaps even from one or more video sources. For example, the viewer can view a list of available TV programs on a website associated with a cable TV station while sitting in his room and make a request of specific TV channels, or create a customized video for delivery that incorporates portions of video elements from one or more TV channels, or select from a menu or catalog of composite TV program selections for delivery. Such composite TV program selections can, for example, be a combination of a scrolling stock ticker tape from a stock market channel, a scrolling news report from a cable news channel, both of them incorporated and displayed over a sports Channel broadcasting a live program of a baseball game. The location, shape, size and other characteristics for the incorporation of the portions of video elements that are combined into another channel may be preset or may be specified by a user in a custom configuration.

Thus, the present invention makes it possible for a cable TV system to provide a custom video to a viewer with a viewing system 105, which may be a media player or an entertainment system, for example. In addition, it enables a media server 103 on the Internet to provide customized video based on one or more media elements. An user can download an English movie, for example, and get customized delivery of a French subtitle that would not be typically delivered for that English movie. And also have a stock ticker from a stock market channel delivered along with it for the duration of the movie. A billing might be involved for such customized delivery, if some of these video elements are not 'free'. In addition, the user can have the English movie streamed and delivered for viewing, with the English audio parts (voice) replaced by an equivalent French (or other) language replacement audio components, along instead of French subtitles. This would involve combining an English or French or another language audio component with a video component that is generic to all language support, such combination conducted by the video processing system 103 prior to delivery to the viewer's viewing system 105.

Thus, the viewer can browse and choose, from a plurality of selections (such as an online catalog). The viewer selects every video element the viewer needs. The remote side constructs customized video for the viewer. The viewer system 105 may include but is not limited to a TV or set-top-box with a TV that receives the customized video delivered and displays it. If, for example, the view system 105 is capable of further facilitating customized video delivery and selections of video elements, then the viewer can further browse and select and configure customized video delivery from the viewing system, media player, set-top-box, TV or entertainment system at home.

Figure 2:
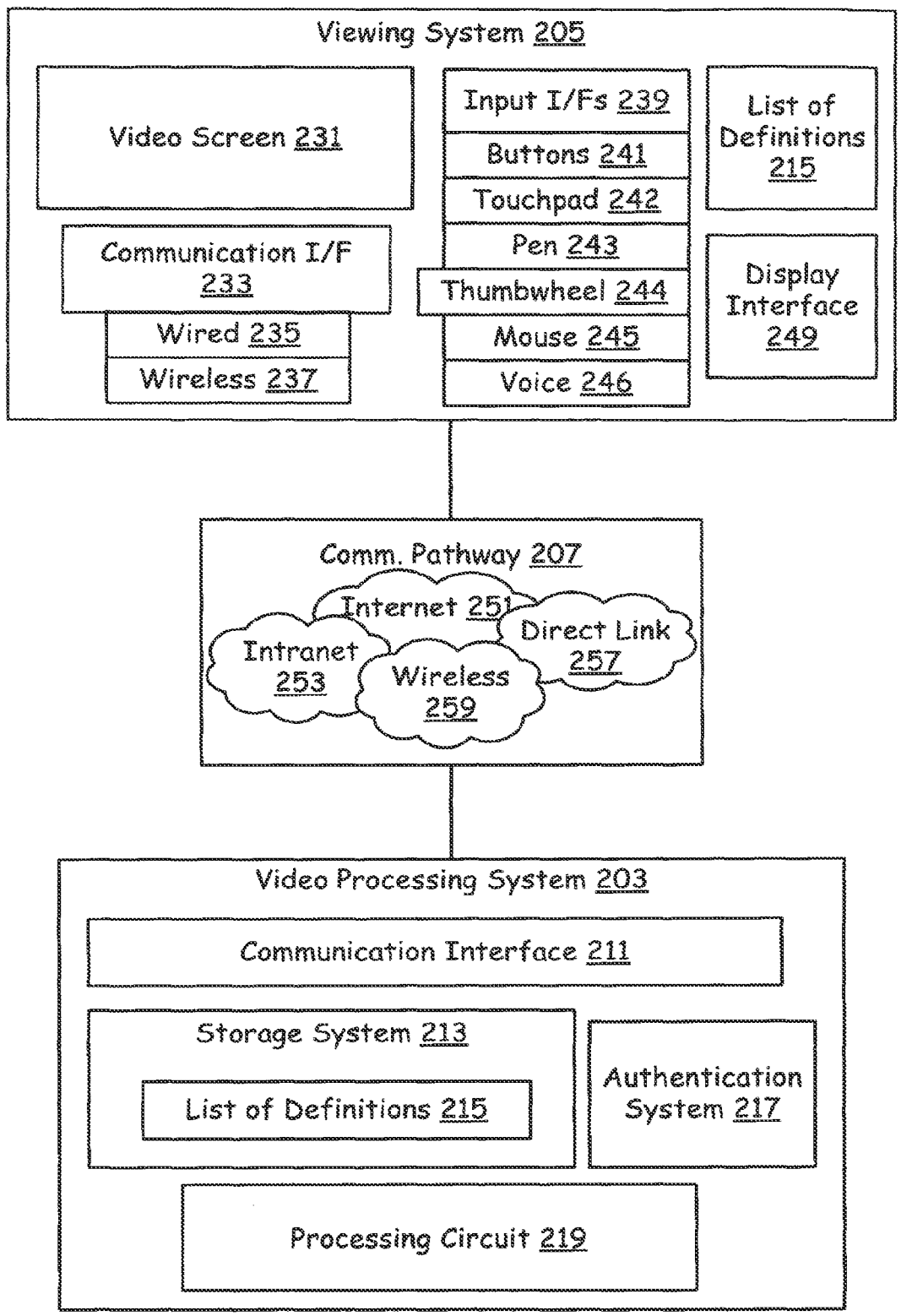
FIG. 2 is a schematic block diagram illustrating an embodiment of the video processing system of FIG. 1.

FIG. 2 is a schematic block diagram illustrating an embodiment of the video processing system of FIG. 1 showing communication path between a video processing system 203 and a viewing system 205. The viewing system 205 includes a video screen 231, a communication interface (IF) 233, an input interface (Input I/F) 239, a display interface 249. The input interface 239 provides for one or more modes of input that a viewer can employ to select media elements, configure combined video outputs, etc. For example, input interface 239 includes buttons 241, a touchpad 242, a pen interface 243, a mouse 245 and a voice interface 246, any of which may be used to specify viewer inputs.

The viewing system 205 receives a list of definitions 215 from the video processing system 203. The viewer can review this list and select from it. The viewing system 205 can also cave it locally. The communication path 207 between the video processing system 203 and the viewing system 205 may include for example, one or more of an Internet connection 251, an Intranet link 253, a direct link 257 and a wireless link 259.

The viewing system 205 may be a media player that is capable of receiving combined media elements and displaying them on the video screen 231. It may facilitate selection by the viewer, via the input interface 239, of one of several available combined video outputs, wherein the viewer can resize, reshape, highlight or relocate specific regions of interest or specific identifiable portions of the combined video provided to it for display.

Figure 3:
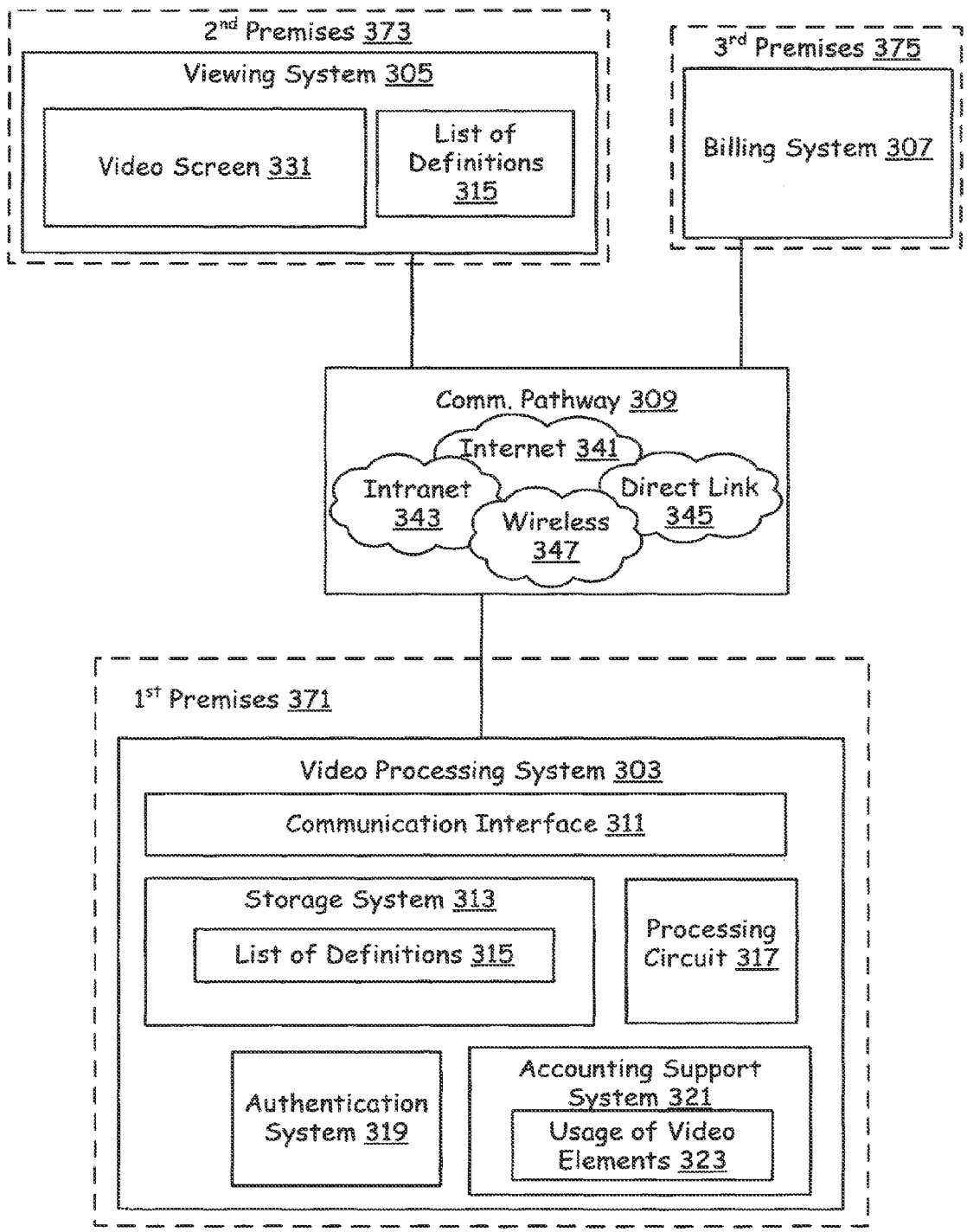
FIG. 3 is a schematic block diagram illustrating an embodiment of the video processing system of FIG. 2.

FIG. 3 is a schematic block diagram illustrating an embodiment of the video processing system of FIG. 2 further providing viewer invoicing support for the custom video generation functionality. The video processing system 303 is located at a first premises 371, the viewing system 305 is located at a second premises 373 and a billing system 307 is located at a third premises 375. The video processing system 303 has an accounting support system 321 that is communicatively coupled to the processing circuit 317. The accounting support system 321 keeps a record of usage of the selected video elements by the video processing system to generate the custom video, 323. When the combined video is delivered to the viewing system 305, the record of usage (or a charge detail record) is forwarded to the billing system 307 via the communication interface 311. The billing system 307 generates an invoice for the viewer which is communicated online or by postal means to the viewer.

The invoices can be sent periodically (once a month, for example) or immediately after the viewer views a combined video that includes a portion of a pay-per-view media element or a media element that is not free. In another embodiment, a prepaid card is used by the viewer to pay for such combined videos. The prepaid card or a credit card may be plugged into a prepaid card reader or a credit card reader attached to the viewing system. The amount associated with the combined video is deducted from the prepaid card or charged to the credit card by a transaction conducted by the viewing system with the billing system 307.

Figure 4:
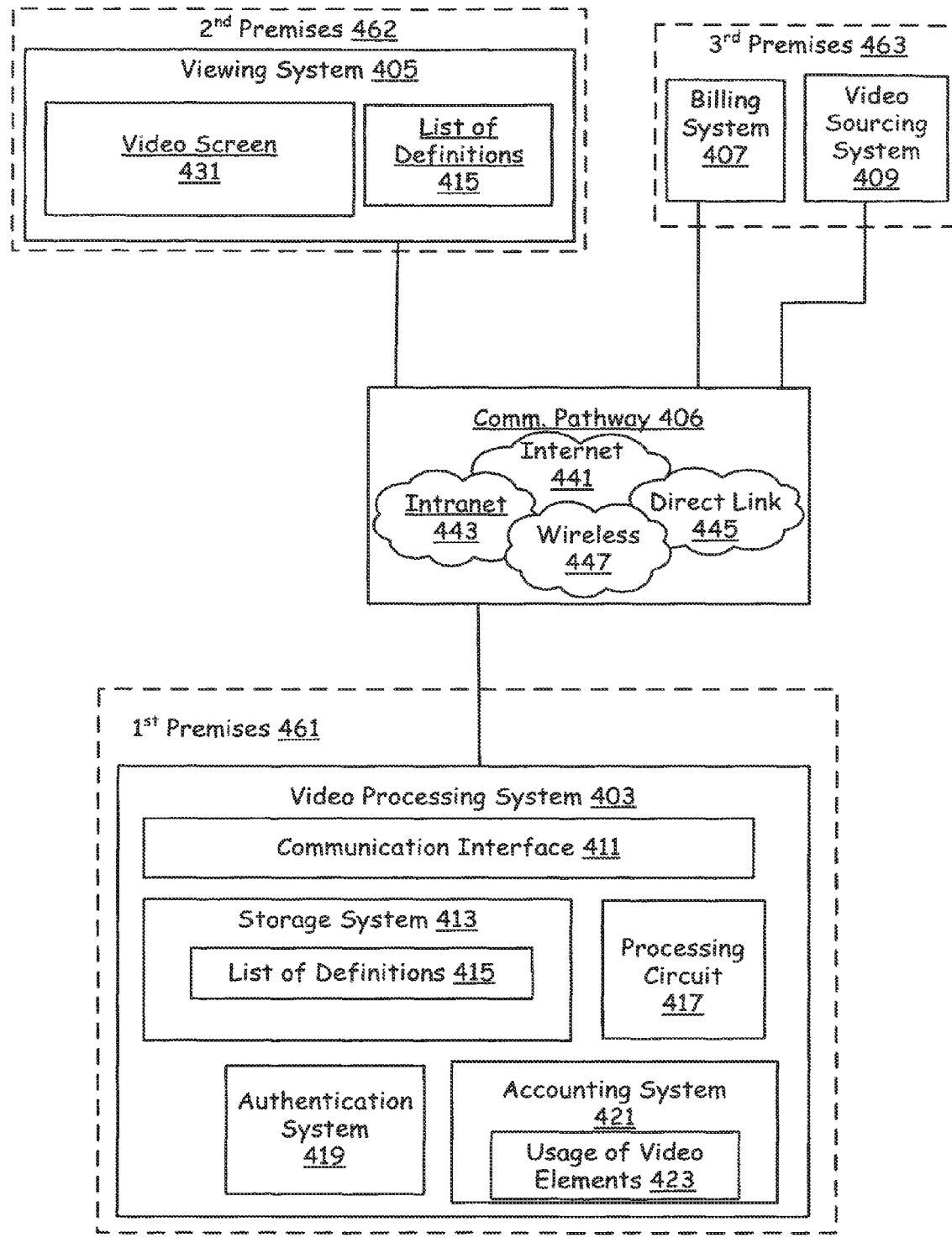
FIG. 4 is a schematic block diagram illustrating an embodiment of the video processing system of FIG. 3.

FIG. 4 is a schematic block diagram illustrating an embodiment of the video processing system of FIG. 3 further providing access to an additional plurality of video elements from a video sourcing system 409. The video sourcing system 409 is communicatively coupled to the video processing system 403 and is located at the third premises 463. The video sourcing system is one or more of a television broadcasting source, a service providers central office, a video camera that provides video live online, a photo camera providing online pictures or stored pictures, an Internet server capable of providing streaming multimedia and a video repository.

The viewer can browse through a catalog of these additional media elements, such as for example, from a website, and incorporate them into the video streams available from the video processing 403. A combined video incorporating such additional video elements are then created by the video processing system 403 for delivery to one or more media players or viewing systems. The additional plurality of video elements from a video sourcing system 409 may be billed separately (or together) when combined with video elements provided by the video processing system 403.

The viewing system 405 receives a list of definitions 415 from the video processing system 403. The viewer can review this list and select from it. The viewing system 405 can also save it locally. The communication path 406 between the video processing system 403 and the viewing system 405 may include for example, one or more of an Internet connection 451, an Intranet link 453, a direct link 457 and a wireless link 459.

In one embodiment, the video processing system 403 is a video broadcasting system that provides a TV programming that is combined with a news oriented ticker tape provided by a cable news channel. In addition, the video sourcing system 409 provides online videos for a baseball game that can be combined with the video elements of the TV programming that is provided by the video processing system 403 for a nominal cost. Alternatively, it provides another scrolling ticker tape of the scores and game action that can be incorporated into other live programs or TV channel broadcasts. The viewer can choose one of these modes or video elements and have them incorporated into the TV programming or a combined video provided by the video processing system 403.

Figure 5:
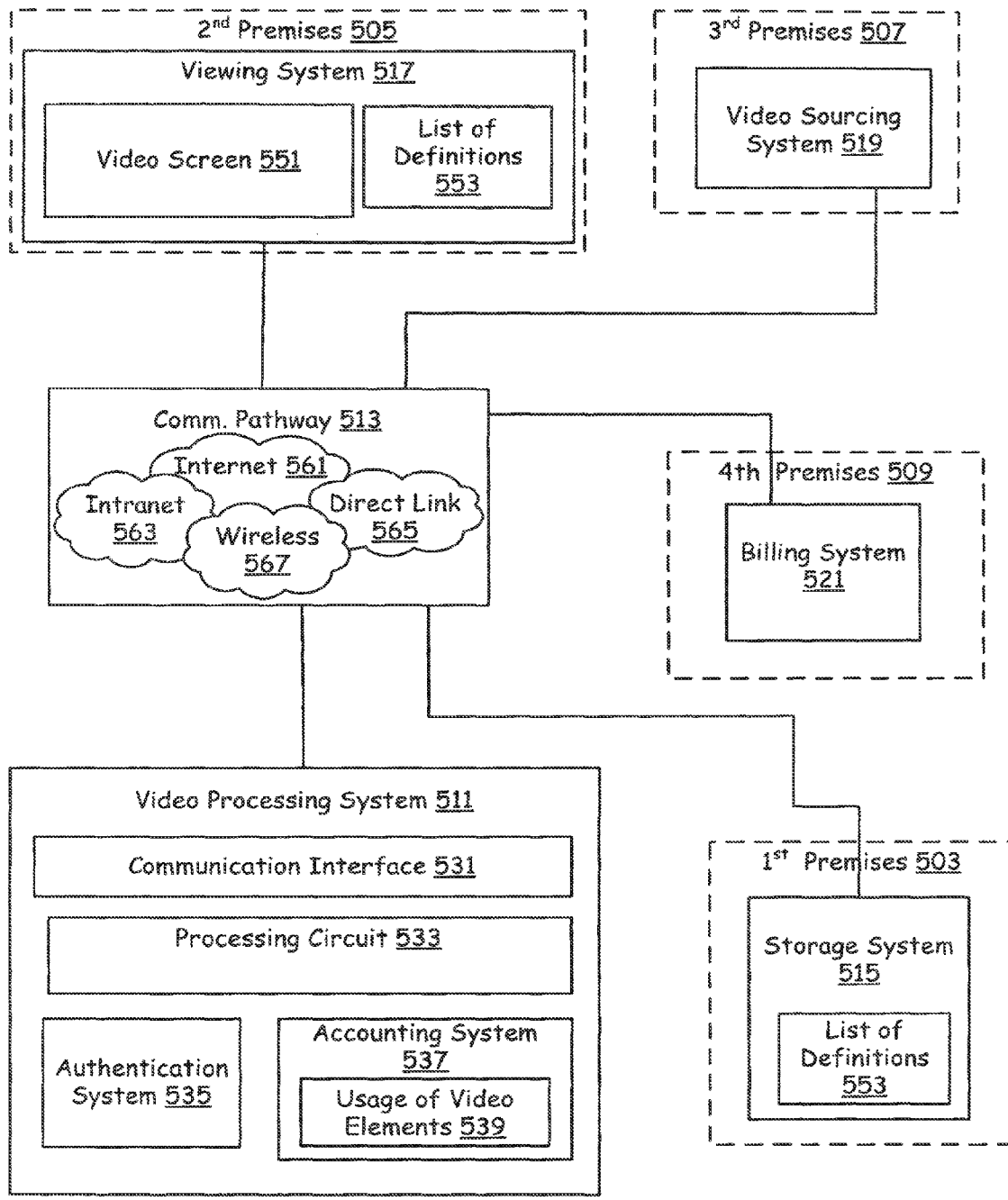
FIG. 5 is a schematic block diagram illustrating an embodiment of the video processing system.

FIG. 5 is a schematic block diagram illustrating an embodiment of the video processing system where the storage system 515 is located at a first premises 503, the viewing system 517 is located at a second premises 505, the video sourcing system 519 is located at a third premises 507 and the billing system 521 is located at a fourth premises 509. The video processing system 511 is communicatively coupled to the storage system 515, the viewing system 517, the video sourcing system 519 and the billing system 521.

The storage system 515 facilitates creating, and storing browsing a catalog entry and a configuration information for each preconfigured combined video that a viewer can browse through and select. The viewer selected combined videos may be a preconfigured set of media elements and associated configuration and metadata information (including video display characteristics). When selected and activated by the viewer, the combined video is generated and delivered for viewing by the viewer by the video processing system 511, for a prefixed duration or until the viewer terminates the delivery of the combined video, or as determined by a schedule.

The viewing system 517 receives a list of definitions 553 from the video processing system 511. The viewer can review this list and select from it. The viewing system 517 can also save it locally. The communication path 513 between the video processing system 511 and the viewing system 517 may include for example, one or more of an Internet connection 561, an Intranet link 563, a direct link 565 and a wireless link 567.

In one embodiment, the storage system 515 is used to store the list of definitions 553 associated with preconfigured combined videos that a viewer can select and view. The list of definitions can be retrieved, stored locally and modified under viewer guidance by the viewing system 517. In addition, an optional schedule is associated with the preconfigured combined videos the generation and or delivery of the combined video is conducted as per the schedule.

Figure 6:
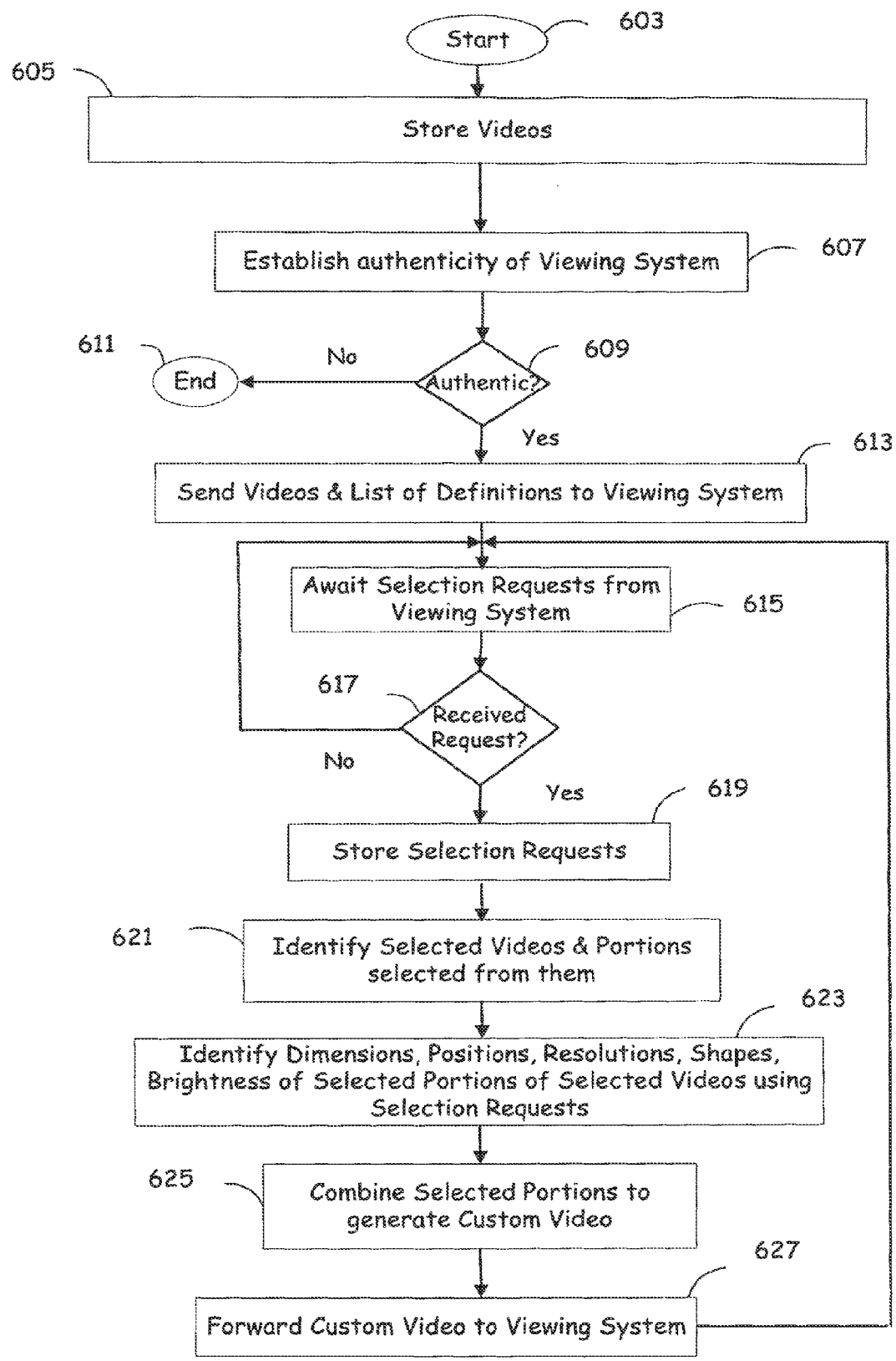
FIG. 6 is a flowchart illustrating a method of constructing a custom video from a plurality of video elements.

FIG. 6 is a flowchart illustrating a method of constructing a custom video from a plurality of video elements by a video processing system as per input from a viewing system through interaction with the viewing system, in accordance with the present invention. The method starts at a start block 603. The video processing system stores the plurality of video elements such as TV video, recorded video, a video games and photos, at block 605. When at this block there are several events (not shown) that cause a transition to the next block 607, such as selection by a viewer of a video part of a TV channel, selection of a pre-recorded video, selection of a video game, selection of a photo, etc.

At the next block 607, the video processing system authenticates the viewing system at block 607. If the authentication fails, then the processing ends at the next block 611. Otherwise, on successful authentication, the video processing system forwards the plurality of video elements and a list of definitions to the viewing system at the next block 613. It awaits selection requests from viewing system at the next block 615. When it receives a viewer's selection requests, it transitions to the next block 619.

At the block 619, the viewing system stores the selection requests received from the viewing system. The selection requests received from the viewing system includes a selection of the portion of the at least one video element, such as a TV channel video stream, and a portion or all of another video element, such as another TV channel video stream. The video processing system identifies the videos selected from the plurality of video elements in block 621 using the selection requests. The selection requests further include definitions of selected portions of selected video elements, dimensions of display, shapes for displaying media elements, brightness levels, and other display characteristics associated with a display unit, such as a TV, and media element related characteristics.

The video processing system then identifies definitions, for e.g., dimensions, positions, resolutions, shapes, brightness of the selected portions of the selected video elements using the selection requests at the next block 623. It then constructs the custom video by combining the selected portions in a next block 625 and forwards the custom video (that is a combined video based on viewer selections) to the viewing system in the next block 627. Then, processing returns to the next block 607 where the next viewer request is awaited.

Figure 7:
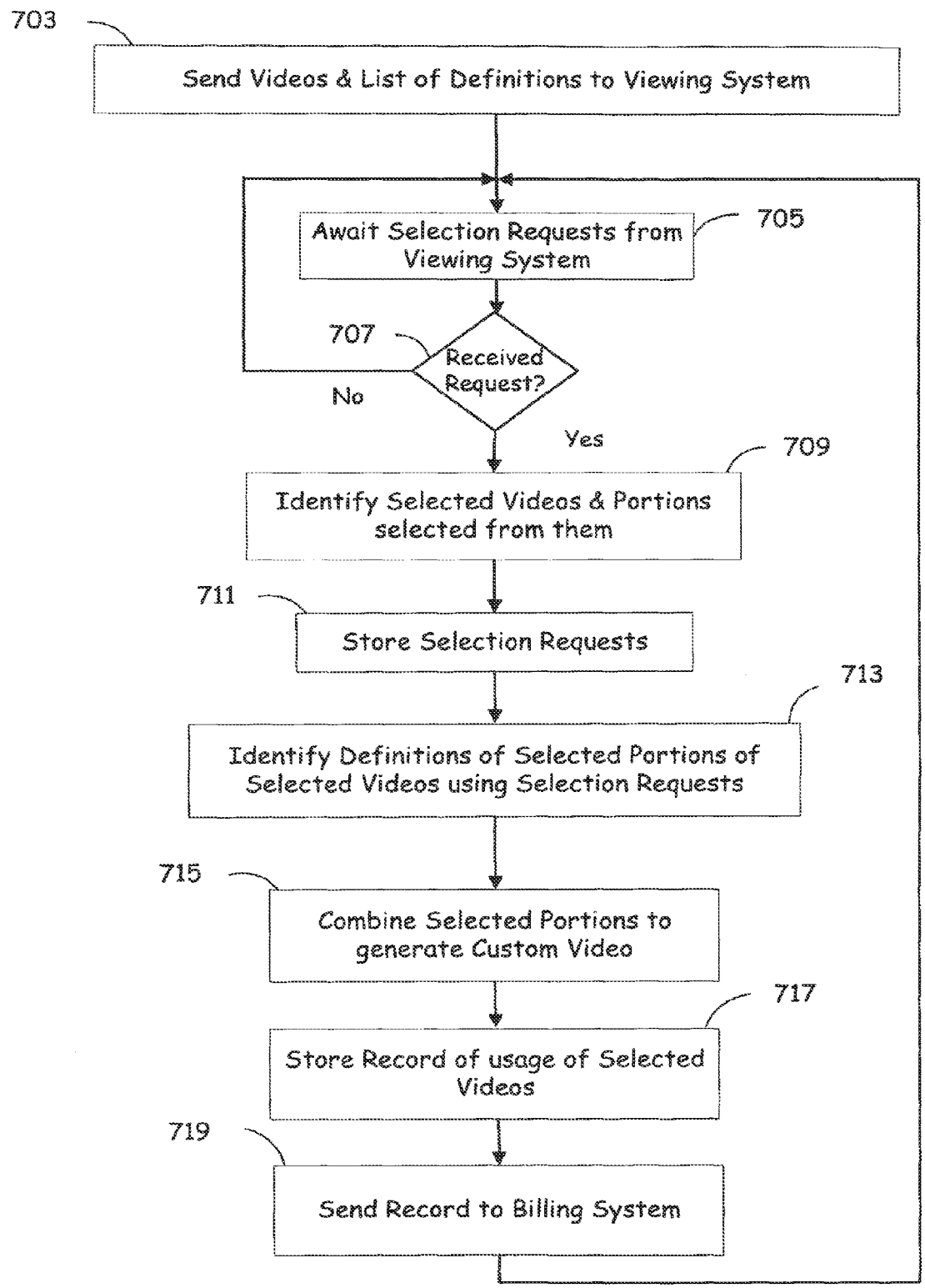
FIG. 7 is a flowchart illustrating the operations of creating and storing a record of usage for the combined videos according to one embodiment of the present invention.

FIG. 7 is a flowchart illustrating the operations of creating and storing a record of usage for the combined videos comprising a plurality of video elements that a viewer receives, and the subsequent communication of the record of usage to a billing system performed by the video processing system of FIG. 6, according to one embodiment of the present invention. Processing commences at the block 703 when the video processing system sends videos and a list of definitions such as a tv channel, video camera, Internet and Photo camera for example, to the viewing system (as also disclosed in a description for the block 613 in FIG. 6). The processing that occurs prior to the processing at the block 703 are similar to, and have been described for, the blocks 603 to 613 for FIG. 6 above.

Transition from the block 703 to the next block 705, where the video processing system awaits a selection request from the viewing system, occurs when a video element selected by a viewer is sent to the viewing system. The video element may be a TV channel video data selected by user, a live video from a video camera (such as those from a baseball match), a media element from an Internet based multimedia server, a photo picture (such as those from a camera), etc.

At the next block 705, the selection requests from the user are awaited. When it receives a viewer's selection requests, it transitions to the next block 709 where the viewer's selected videos and portions selected from them (such as regions of interest selected when a plurality of regions of interest are presented along with the media element) are identified. The selected videos includes a selection of the portion of the at least one video element, such as a. TV channel video stream or a live streaming media of a baseball match, etc., and a portion or all of another video element, such as another TV channel video stream. Then, at a next block 711, the viewing system stores the selection requests received from the viewing system.

At the next block 713 the selected portions of selected videos from the viewer's selection request are identified for processing. The selection requests may also include definitions of selected portions of selected video elements, dimensions of display, shapes for displaying media elements, brightness levels, and other display characteristics associated with a display unit, such as a TV, and media element related characteristics. The video processing system then identifies definitions, for e.g., dimensions, positions, resolutions, shapes, brightness of the selected portions of the selected video elements using the selection requests.

At the next block. 715, the custom video is created by combining the selected portions. The processing circuitry of the video processing circuit employs region of interest analysis techniques, video layer replacement techniques, video layer masking techniques, video layer highlighting techniques, object recognition techniques, object replacement techniques, video mixing techniques, etc., as necessary, in creating the custom video.

At the next block 717, the custom video (that is a combined video based on viewer selections) is communicated/delivered to the viewing system and a usage record associated with the custom video is stored. Then, at a next block 719, the record of usage or a charge detail record created from it is communicated to a billing system for optional billing. The billing system may be external to the video processing system and to the viewing system.

Then, processing returns to the next block 607 where the next viewer request is awaited. Then control returns to the block 707 where the next request is awaited. Thus, in accordance to the present invention, the video processing system generates the custom video and stores the record of usage for the selected video elements. The record of usage is sent to a billing system for billing purposes.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

Therefore, the following is claimed:

1. A system, comprising:
a video viewing device; and
a video processing system communicatively coupled to the video viewing device via a network, the video processing system configured to:

receive a request for customized video from the video viewing device,
   the request comprising a selection of at least a plurality of video elements and a plurality of corresponding definitions for each of the plurality of video elements,
   the plurality of corresponding definitions being selected from a list of definitions via an interface of the video viewing device and indicating a spatial arrangement for displaying the plurality of video elements, and
   the plurality of corresponding definitions comprising (i) at least one of a position or a dimension of the corresponding video element, (ii) at least one of a brightness level or a shape of the corresponding video element, and (iii) a resolution of the corresponding video element;
access the plurality of video elements selected; and
generate the customized video for delivery via a television channel to the video viewing device over the network for a duration as determined by a schedule, wherein the customized video comprises at least the plurality of video elements arranged according to the spatial arrangement for simultaneous display,
wherein the plurality of video elements comprise a first video element associated with a first video stream from a first video source and a second video element associated with a second video stream from a second video source, and
wherein a record of usage of the customized video is stored.

2. The system of claim 1, wherein at least one of the plurality of video elements is selected from a group consisting of a television channel, a website, a video game, a stored picture, a subtitle, a news ticker, a stock ticker, and a score or game action ticker.

3. The system of claim 1, wherein the list of definitions is stored on the video processing system, and is sent from the video processing system to the video viewing device and stored locally on the video viewing device.

4. The system of claim 1, wherein the interface is configured to resize, reshape, highlight, or relocate an identifiable portion of the customized video.

5. The system of claim 1, further comprising a billing system communicatively coupled to the video viewing device over the network, wherein the billing system is configured to generate an invoice specific to the video viewing device according to the record of usage of the customized video, wherein the record of usage is received from the video viewing device.

6. The system of claim 1, further comprising an authentication system configured to authenticate the video viewing device prior to the delivery of the customized video from the video processing system to the video viewing device.

7. The system of claim 1, wherein the second video element comprises a media element, and wherein the second video element is provided for a duration of the first video element.

8. The system of claim 7, wherein the media element comprises at least one of a subtitle, a video game, a stored picture, a news ticker, a stock ticker, or a score or game action ticker.

9. The system of claim 1, wherein at least one of the plurality of video elements included in the customized video requires a payment for viewing of the at least one of the plurality of video elements.

10. The system of claim 1, wherein at least one of the plurality of video elements included in the customized video comprises a pay-per-view element.

11. A method, comprising:
receiving, by a video processing system in communication with a viewing system over a network, a request for customized video from the viewing system,
   the request comprising a selection of at least a plurality of video elements and a plurality of corresponding definitions for each of the plurality of video elements,
   the plurality of corresponding definitions being selected from a list of definitions via an interface of the viewing system and indicating a spatial arrangement for displaying the plurality of video elements, and
   the plurality of corresponding definitions comprising (i) at least one of a position or a dimension of the corresponding video element, (ii) at least one of a brightness level or a shape of the corresponding video element, and (iii) a resolution of the corresponding video element;
accessing, by the video processing system, the plurality of video elements selected; and
generating, by the video processing system, the customized video for delivery via a television channel to the viewing system over the network for a duration as determined by a schedule, wherein the customized video comprises at least the plurality of video elements arranged according to the spatial arrangement for simultaneous display,
wherein the plurality of video elements comprise a first video element associated with a first video stream from a first video source and a second video element associated with a second video stream from a second video source, and
wherein a record of usage of the customized video is stored.

12. The method of claim 11, wherein at least one of the plurality of video elements is selected from a group consisting of a television channel, a website, a video game, a stored picture, a subtitle, a news ticker, a stock ticker, and a score or game action ticker.

13. The method of claim 11, wherein the viewing system is selected from a group consisting of a television, a set-top-box, a media player device, and an entertainment system.

14. The method of claim 11, further comprising authenticating, by an authentication system, the video system prior to the delivery of the customized video from the video processing system to the viewing system.

15. The method of claim 11, further comprising generating, by a billing system, an invoice specific to the viewing system according to the record of usage of the customized video, wherein the record of usage is accessed from the viewing system.

16. A method, comprising:
sending, by a viewing system in communication with a video processing system over a network, a request for customized video generated by the viewing system,
   wherein the request comprises a selection of at least a plurality of video elements and a plurality of corresponding definitions for each of the plurality of video elements, the plurality of corresponding definitions comprising (i) at least one of a position or a dimension of the corresponding video element, (ii) at least one of a brightness level or a shape of the corresponding video element, and (iii) a resolution of the corresponding video element, the plurality of corresponding definitions being selected from a list of definitions via a user interface of the viewing system and indicating a spatial arrangement of the plurality of video elements, the list of definitions accessed locally on the viewing system and received from the video processing system; and displaying, by the viewing system, the customized video received via a television channel from the video processing system over the network for a duration as determined by a schedule, the plurality of video elements of the customized video displayed simultaneously, wherein the customized video is generated by the video processing system utilizing at least the plurality of video elements and the spatial arrangement of the plurality of video elements, wherein the plurality of video elements comprise a first video element associated with a first video stream from a first video source and a second video element associated with a second video stream from a second video source, and wherein a record of usage of the customized video is stored.

17. The method of claim 16, wherein at least one of the plurality of video elements is selected from a group consisting of a television channel, a website, a video game, a stored picture, a subtitle, a news ticker, a stock ticker, and a score or game action ticker.

18. The method of claim 16, wherein the viewing system is selected from a group consisting of a television, a set-top-box, a media player device, and an entertainment system.

* * * * *